US006905151B2

(12) United States Patent
Froment et al.

(10) Patent No.: US 6,905,151 B2
(45) Date of Patent: *Jun. 14, 2005

(54) LINEARLY ACTUATED QUICK CONNECT PIPE COUPLINGS

(75) Inventors: Jean-Paul Froment, Doussard (FR); Jean-Jacques Lacroix, Lovagny (FR); Antoine Chambaud, Giez (FR)

(73) Assignee: Staubli Faverges, Faverges (FR)

( * ) Notice: Subject to any disclaimer, the term of this patent is extended or adjusted under 35 U.S.C. 154(b) by 0 days.

This patent is subject to a terminal disclaimer.

(21) Appl. No.: 10/286,885

(22) Filed: Nov. 4, 2002

(65) Prior Publication Data

US 2003/0085574 A1 May 8, 2003

(30) Foreign Application Priority Data

Nov. 6, 2001 (FR) ............................................ 01 14346

(51) Int. Cl.[7] .............................................. F16L 17/00
(52) U.S. Cl. ........................ 285/376; 285/86; 285/315; 285/396; 285/401
(58) Field of Search ................................. 285/358, 394, 285/86, 307, 308, 315, 360, 361, 362, 376, 377, 396, 401, 402

(56) References Cited

U.S. PATENT DOCUMENTS

| | | | |
|---|---|---|---|
| 1,622,216 A | | 3/1927 | Anlauf et al. |
| 1,871,370 A | | 8/1932 | Jacques |
| 2,327,503 A | | 8/1943 | Coberly |
| 2,799,344 A | * | 7/1957 | Muse ........................ 285/396 |
| 3,097,001 A | | 7/1963 | Le Bus, Sr. |
| 3,211,479 A | | 10/1965 | Brown |
| 3,356,142 A | * | 12/1967 | Crow et al. .................. 166/134 |
| 3,625,251 A | | 12/1971 | Nelson |
| 3,858,910 A | * | 1/1975 | Oetiker ........................ 285/376 |
| 4,199,210 A | * | 4/1980 | Trott ........................... 285/360 |
| 4,278,278 A | * | 7/1981 | Chambless et al. ......... 285/361 |
| 4,313,626 A | * | 2/1982 | Duncan ........................ 285/86 |
| 4,566,723 A | | 1/1986 | Schulze et al. |
| 5,009,252 A | | 4/1991 | Faughn |
| 5,029,973 A | | 7/1991 | Rink |
| 5,087,086 A | * | 2/1992 | Snedeker .................... 285/361 |
| 5,451,031 A | * | 9/1995 | Purvis et al. ............... 285/315 |
| 5,466,020 A | | 11/1995 | Page et al. |
| 5,741,084 A | * | 4/1998 | Del Rio et al. ............. 285/396 |
| 5,889,228 A | | 3/1999 | Ewick et al. |
| 6,173,742 B1 | | 1/2001 | Smith, III |

FOREIGN PATENT DOCUMENTS

| | | |
|---|---|---|
| CH | 405839 | 1/1966 |
| DE | 508311 | 9/1930 |
| EP | 1164327 A1 * | 12/2001 |

* cited by examiner

Primary Examiner—Aaron Dunwoody
(74) Attorney, Agent, or Firm—Dowell & Dowell, P.C.

(57) ABSTRACT

A quick connect coupling for removably connecting two pipes which comprises a male element adapted to fit into a female element along a principal axis of the coupling. The Female element includes at least one ramp for receiving a radial projection of the male element to lock these elements together. The ramp is formed in a ring freely rotatably mounted in the female element, and fixed in translation along the principal axis, while the projection is fixed with respect to the male element. The ramp forms a seat for locking the radial projection. Locking is obtained by essentially axial movements of the male and female elements with respect to one another.

9 Claims, 7 Drawing Sheets

LINEARLY ACTUATED QUICK CONNECT PIPE COUPLINGS

BACKGROUND OF THE INVENTION

1. Field of the Invention

The present invention relates to a quick connect coupling which comprises elements adapted to fit in one another for the joining of two pipes through which a fluid flows under pressure.

2. Description of the Related Art

It is known to provide a quick connect coupling with an outer button intended to control a mechanism for locking a male element of the connection inside a female element to permit a selective release of the male element. The effort of maneuvering such a button increases with the diameter of the connection and the pressure of the fluid transiting in this connection, as the locking mechanism comprises a spring whose stiffness constant increases as a function of these values. In addition, such locking mechanisms incorporating a button are relatively precise and expensive mechanisms.

It is also known to use connections incorporating balls and a locking bush, the balls being controlled by the position of the bush around one of the elements of the connection. Such connections require a free volume around the connections sufficient for maneuvering the bush, such a volume not always being available.

It is also known, for example by U.S. Pat. No. 4,909,545, to provide on the body of a connection element ramps for receiving catches projecting radially from the body of the other element. The locking of the connection requires a combined relative movement of translation and of rotation of its constituent elements, which may reduce the reliability of the assemblies made.

Finally, U.S. Pat. No. 3,211,479 discloses providing, on a connection, a sleeve adapted to penetrate in a bush equipped, on its inner surface, with studs provided to cooperate with ramps made on the outer surface of the sleeve. The sleeve thus forms a male endpiece. Now, the male endpieces are often mounted at the end of flexible tubes in industrial installations. They are therefore likely to fall and remain on the ground where they may receive shocks and where they are subjected to pollution. For all these reasons, the known device of U.S. Pat. No. 3,211,479 cannot be considered as reliable in an industrial environment.

It is a particular object of the invention to overcome these drawbacks by proposing a novel type of connection which allows locking and unlocking without too great an effort, including in the case of a connection with large diameter and for fluids under high pressure, while it is not necessary to manipulate the connection in rotation in order to connect or disconnect the connection.

SUMMARY OF THE INVENTION

To that end, the invention relates to a quick connect coupling for joining two pipes, wherein the coupling includes a male and a female element wherein the male element is adapted to fit in the female element along a principal axis. The female element includes at least one ramp for receiving a radially projecting part of the male element, with a view to locking these elements. The ramp is formed with a ring mounted on the female element, which ring is free to rotate but is in fixed translation along the principal axis of the coupling. The ramp forms at least one first seat for locking the projecting part when the coupling is in a configuration to permit fluid passage and a second seat, offset radially with respect to the first seat, for locking the projecting part in a configuration which permits decompression or venting of a downstream.

Thanks to the invention, the movement of locking and of unlocking of the connection may be essentially effected along an axial direction, without necessitating rotation by the user. In effect, the rotation corresponding to the locking is obtained by the automatic rotating movement of the ring with respect to the element on which it is mounted. In addition, the male element or endpiece is very robust, as the projecting elements may be studs integral with the body of this endpiece. The movements of rotation of the ring inside the female element allow, on their own, the coupling and uncoupling of the elements of the connection displaced axially with respect to one another. The ring is protected from the outside environment, in particular against shocks and pollution, by the body of the female element.

Within the meaning of the present invention, the notion of "fixed in translation" means that the ring is immobilized axially between two stops. Of course, a certain clearance remains admissible, which corresponds to a possibility of axial movements of low amplitude for the ring.

BRIEF DESCRIPTION OF THE DRAWINGS

The invention will be more readily understood on reading the following description of five forms of embodiment of a quick connection in accordance with its principle, given solely by way of example and made with reference to the accompanying drawings, in which.

DESCRIPTION OF PREFERRED EMBODIMENTS

Referring now to the drawings, the connection shown in FIGS. 1 to 5 comprises a male element A and a female element B both provided to be of substantially cylindrical shape with circular cross-section. The rear part of the male element A is fluidically connected to a first pipe $C_1$, or upstream pipe, while the rear part of the female element B is connected to a second pipe $C_2$, or downstream pipe.

X–X' denotes the principal axis of the connection formed by the elements A and B, i.e. the principal axis of the elements A and B in the configurations of FIGS. 1 to 4, in a direction in which these elements may be fitted in each other.

Figure 1:
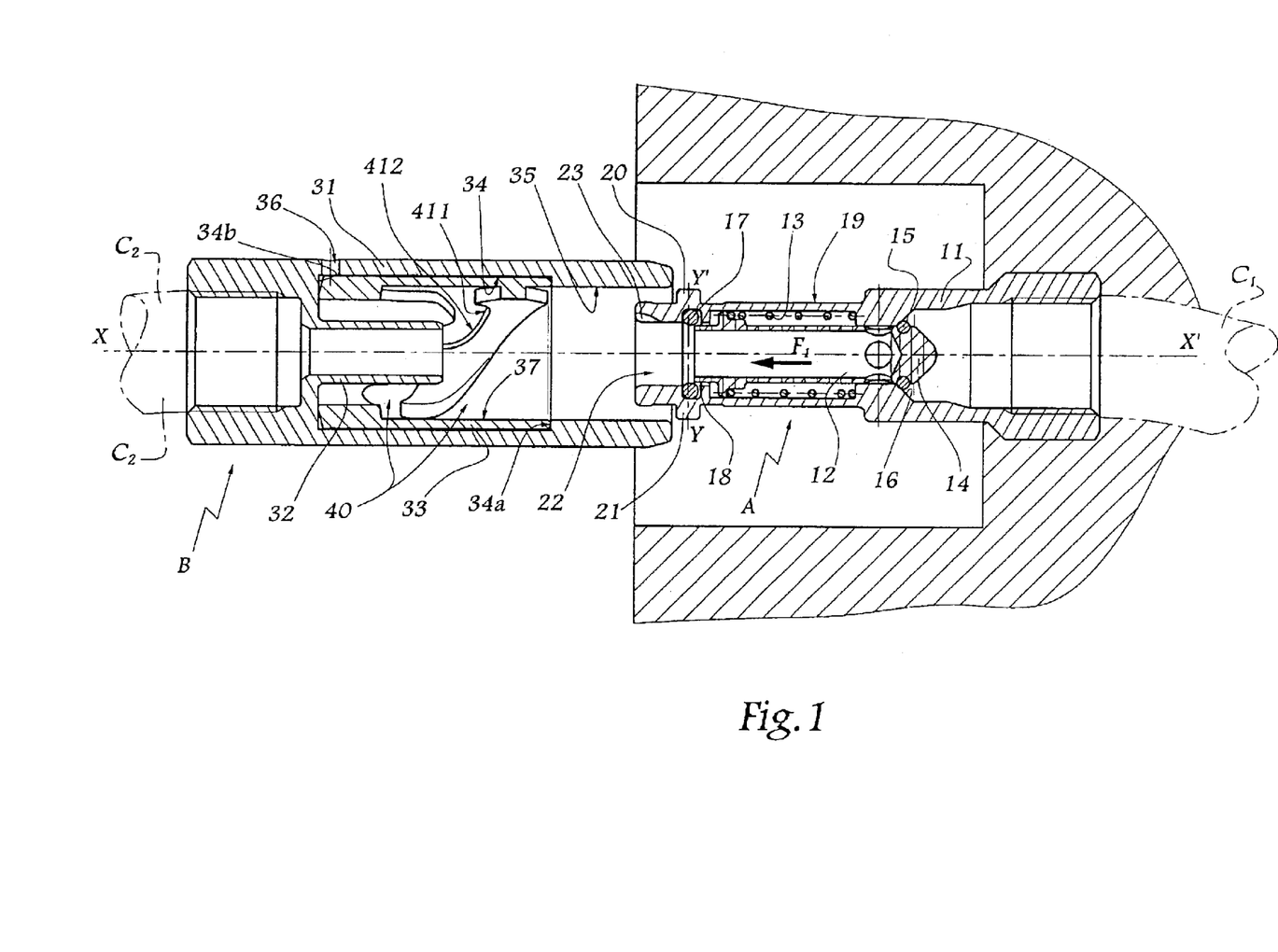
FIG. 1 is a longitudinal section through a connection according to the invention, in uncoupled configuration.

The element A comprises a body 11 inside which is arranged a valve 12 elastically loaded by a spring 13 exerting an effort $F_1$ tending to apply a head 14 of the valve 12 equipped with an O-ring 15 against a seat 16 formed by the body 11. A second O-ring 17 is provided in an annular groove 18 made inside the body 11. On its outer radial surface 19, the body 11 is provided with two catches 20 and 21 diametrally opposite with respect to each other and extending in a direction Y–Y' substantially perpendicular to the axis X–X'. The catches 20 and 21 are in one piece with the body 11.

The element B comprises a body 31 forming a pusher 32 provided to penetrate in the inner volume 22 of the body 11 and to push the valve 12 against the effort $F_1$.

A ring 33 is mounted in a housing 34 provided in the inner radial surface 35 of the body 31, the ring 33 being free to rotate with respect to the body 31 about the axis X–X' and fixed in translation with respect to this body along this axis, due to its bearing against the opposite edges 34a and 34b of the housing 34.

A bore 36 connects the housing 34 to the outside of the element B, through the body 31.

On its inner radial surface 37, the ring 33 is provided with two ramps 40 and 41 hollowed in the surface 37. The geometry of the ramp 40 is developed in FIG. 5 where the trace of the catch 20 is represented in several positions, in dashed and dotted lines.

Figure 5:
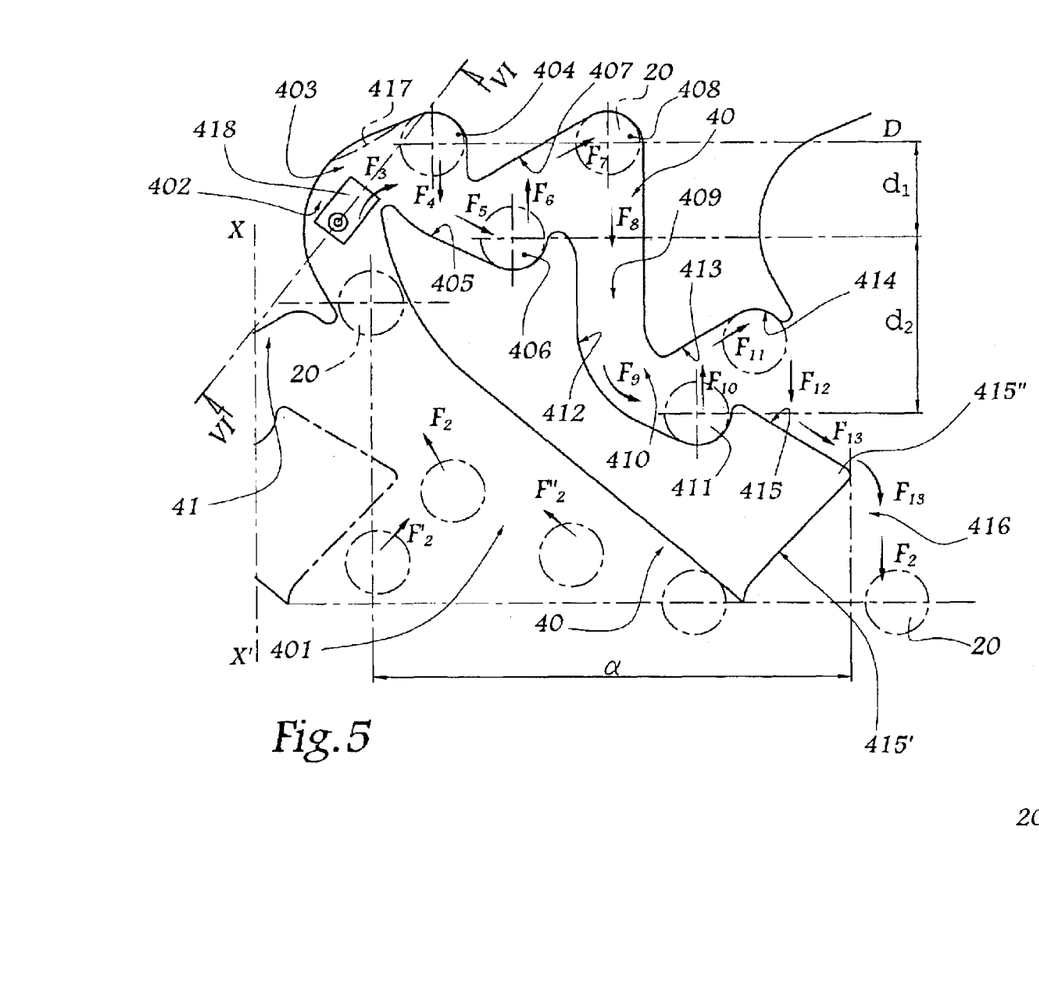
FIG. 5 is a developed view of a ramp of the connection of FIGS. 1 to 4.

The ramp 40 comprises an inlet section 401 converging in the direction of a passage 402 extending substantially in a direction parallel to axis X–X'. A curved part 403 is also provided, this part extending in a hollow 404 of which the radius of curvature is such that it may receive and serve as stop for the catch 20.

When the male element A is being fitted in the female element B, the catch 20 advances in the section 401 in the direction of the passage 402, as represented by arrows $F_2$, $F'_2$ and $F''_2$ which correspond to different possible angular orientations of the catches 20 with respect to the ring 33 at the beginning of fit.

In practice, the advance of the catch 20 corresponds to a relative movement of the catch with respect to the ring 33, because the ring rotates about axis X–X'.

The catch 20 then arrives in the passage 402, then follows the curved part 403 as represented by arrow $F_3$, with the result that it arrives into abutment in the hollow 404. The configuration is in that case that of maximum fit of the male element A in the female element B.

The user perceives that he has attained the maximum stroke and can release element A or element B, depending on which one he has in his hand. In that case, the effort $F_1$ tends to push the pusher 32 towards the outside of the volume 22, which induces a relative displacement of the male and female elements in the sense of opening. This involves a displacement of the catch 20 in the ramp 40 in the direction of a surface 405 inclined with respect to axis X–X', such displacement being represented by arrow $F_4$. When the catch 20 is in abutment against the surface 405 and taking into account the orientation of this surface with respect to axis X–X', the catch 20 slides against this surface until it is immobilized in a second hollow 406 of which the geometry is such that it can serve as seat for locking the catch 20 in the ramp 40.

Figure 2:
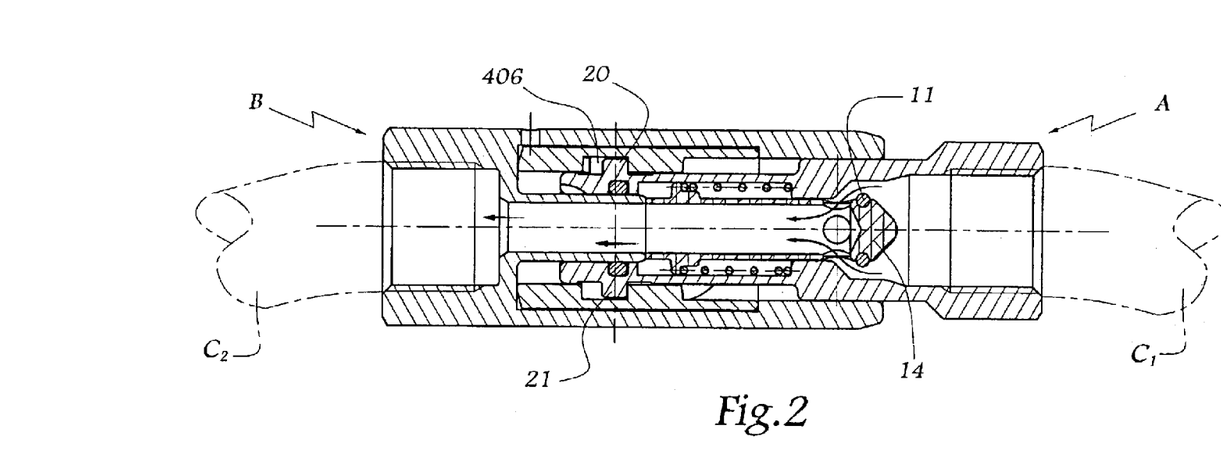
FIG. 2 is a view similar to FIG. 1, with the connection in configuration of passage.

With this position of the catch 20 in the ramp 40, the elements A and B are coupled in the position of FIG. 2, which means that the connection allows for fluid passage. A high pressure of the fluid transiting through the connection has no negative influence on the reliability of the relative immobilization of elements A and B.

Arrow $F_5$ represents the progress of the catch 20 along the surface 405.

When it is desired to uncouple elements A and B, it suffices for the user to exert a fresh axial effort of fit of the male element in the female element, which has the effect of bringing the catch 20 into contact with a surface 407 which is inclined with respect to axis X–X' in a direction opposite to surface 405. The corresponding relative movement of the catch 20 is represented by arrow $F_6$ in FIG. 5. The surface 407 extends in a hollow 408 forming a stop, like hollow 404, the movement of the catch 20 along the surface 407 being represented by arrow $F_7$.

When the user feels that he has reached the position of maximum fit of elements A and B again, it suffices for him to release the element which he is holding in his hand, for the catch 20 to be driven from the hollow 408 under the effect of the effort $F_1$ this being represented by arrow $F_8$.

The ramp 40 comprises a second passage 409 substantially parallel to axis X–X', this passage extending in a curved part 410 which opens out on a hollow 411 forming a second seat for locking the catch 20. 412 denotes the outer surface of the ramp 40 at the level of the curved part 410, this surface making it possible to guide the catch 20 in the direction of the hollow 411, as represented by arrow $F_9$.

A distance $d_1$, taken parallel to axis X–X', between the center of the catch 20, when it is in the hollow 404 and in the hollow 406, corresponds to the "excess stroke" made during fitting of the elements A and B.

The hollows 404 and 408 are substantially aligned in a direction D perpendicular to axis X–X', in FIG. 5, with the result that the distance $d_1$ also corresponds to the distance, taken parallel to axis X–X', between the center of the catch 20, respectively, in place in the hollows 406 and 408. However, such alignment of the hollows 404 and 408 is not always necessary.

Figure 3:
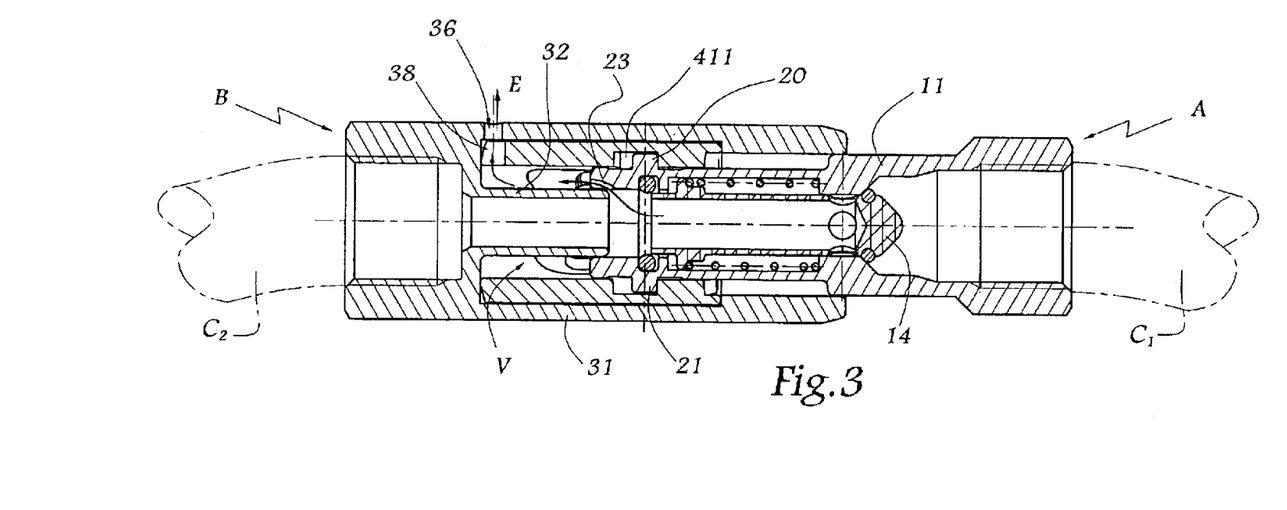
FIG. 3 is a view similar to FIG. 1, with the downstream pipe associated with the connection in configuration of decompression.
Figure 4:
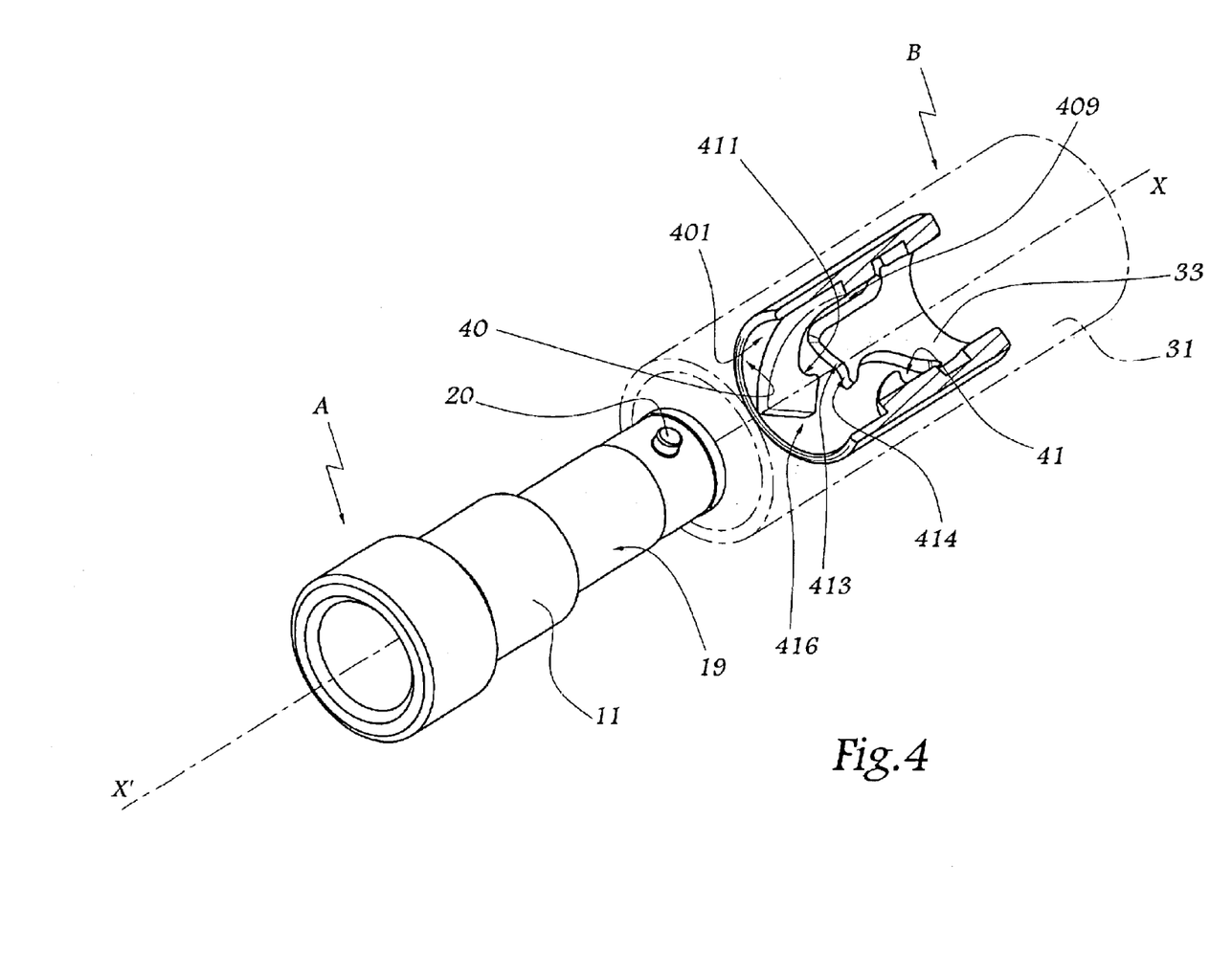
FIG. 4 is a view in partial perspective of the connection of FIGS. 1 to 3, the female element being shown partially in dashed and dotted lines and with a part torn away.

A distance $d_2$, taken parallel to axis X–X', between the center of the catch 20, respectively, in place in the hollows 406 and 411 is chosen so that, when the catch 20 is in place in the hollow 411, the connection is in the configuration of FIG. 3, in which the pusher 32, although still engaged in the volume 22, does not overlap a notch 23 provided on the body 11, this allowing a flow of the fluid present in the downstream pipe $C_2$ in the direction of a volume V made around the pusher 32 and inside the body 31. A notch 38 provided on an edge of the ring 33 allows an evacuation of the fluid towards the outside of the connection, through the bore 36, such flow being represented by arrows E in FIG. 3.

When pipe $C_2$ has been drained, it suffices for the user to exert a fresh effort of axial fit of elements A and B, which has the effect of displacing the catch 20 in the direction of a surface 413 inclined with respect to axis X–X' in the same direction as surface 407, this being represented by arrow $F_{10}$ in FIG. 5. The catch then advances along this surface, as represented by arrow $F_{11}$, and reaches a third hollow 414, from which the catch 20 may be displaced, as represented by arrow $F_{12}$, in the direction of a surface 415 inclined with respect to axis X–X' in the same direction as the surfaces 405 and 412. The catch 20 may then slide along this surface in the direction of the outlet opening 416 of the ramp 40, as represented by arrow $F_{13}$.

The opening 416 corresponds, in fact, to the inlet opening of the ramp 41. The angle α between the openings 401 and 416 is, in effect, equal to about 180°, each of the ramps 40 and 41 extending substantially over an inner semicircumference of the ring 33.

From its position in the opening 416, the catch 20 may easily be withdrawn from the ramp 40.

The surface 415 defines, with a surface 415' inclined in the opposite direction with respect to axis X–X', a nose 415" substantially aligned axially with the hollow 414. This nose opposes an axial introduction of the catch 20 towards the hollow 414 and deflects it towards the section 401 and the passage 402, which is represented by arrow $F'_2$ in FIG. 5.

Taking into account the geometry of the ramp 40 and that of the ramp 41 which is similar, an efficient locking of the catches 20 and 21 with respect to the female element B is obtained by exerting solely substantially axial efforts, i.e. parallel to axis X–X', on one or the other of the male or female elements of the connection. The advance of the catch 20 in the ramp 40, as represented by arrows $F_2$ to $F_{12}$, is therefore obtained by the essentially axial movements of one of these elements.

It is therefore possible to make the connection according to the invention without having lateral access to one of the connection elements, for example in the event of one of these elements being embedded, as represented in dashed and dotted lines, for element A, in FIG. 1.

In addition, the ring 33 is mechanically protected against shocks and pollution by the body 31. The catches 20 and 21 being in one piece with the body 11, the endpiece A is very robust and may be mounted at the end of a flexible pipe.

In order to improve reliability of the locking at the moment of passage of the catch 20 in the curved part 403, the outer surface 417 of this part may be provided to be incurved towards the inside of the ramp 40, as represented in dashed and dotted lines in FIG. 5, this inducing an acceleration of the relative speed of the catch with respect to the ramp after the passage of the catch at the level of the apex of the incurved part 417. This avoids a release of the axial effort in the direction of the hollow 404, hence the insurance that the catch 20 comes into abutment in this hollow.

In the passage 402 there may be provided an elastic blade 418 fixed by a rivet 419 or any other means in the bottom 420 of the ramp 40, this blade 418 tending, under the effect of its own elasticity, to detach its free end 418a with respect to the bottom 420, as represented by arrow $F_{14}$.

Figure 6:
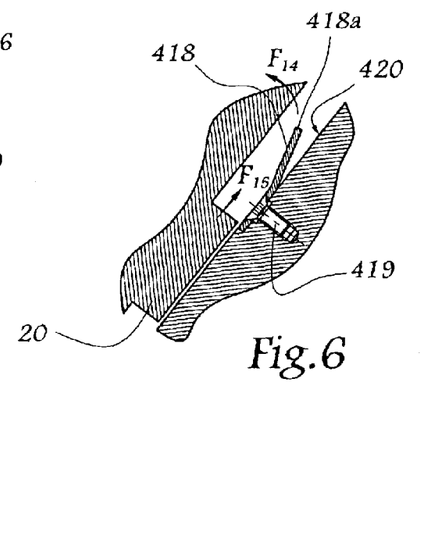
FIG. 6 is a partial section, on a larger scale, along line VI—VI of FIG. 5.

When a catch 20 advances in the direction of the hollow 404 as represented by arrow $F_{15}$ in FIG. 6, it pushes the end 418a of the blade 418 in the direction of the bottom 420, thanks to an elastic deformation of this blade. On the other hand, if the catch 20 returns in the direction of the passage 402 from the hollow 404, it abuts on the blade 418 without being able to bend it down towards the bottom. The blade 418 therefore constitutes a non-return device of the catch 20 during the advance in the ramp 40, which imposes the direction of advance of the catch 20 in the ramp 40 from the inlet section 401 up to the outlet opening 416. In particular, it is not possible to uncouple the connection without passing the catch 20 via the second seat or hollow 411, which allows a decompression of the downstream pipe $C_2$.

Figure 7:
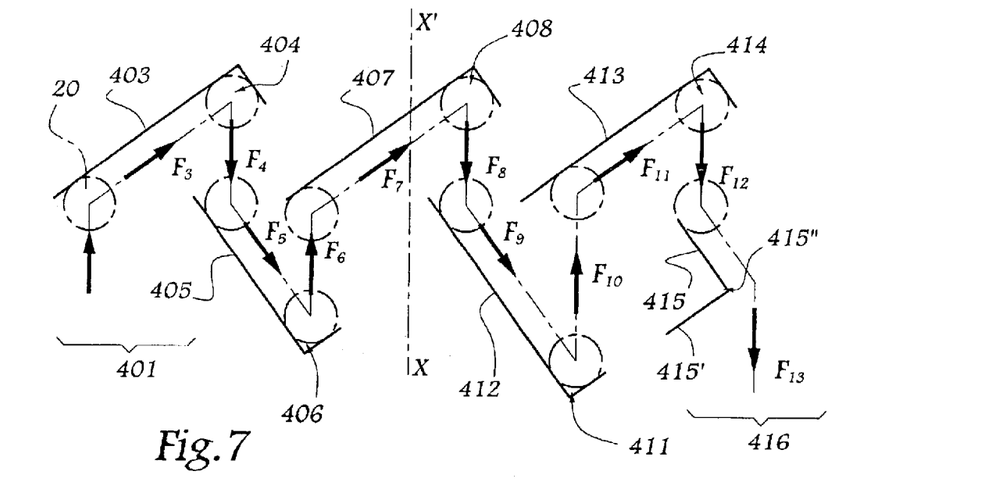
FIG. 7 is a schematic representation of the development of the ramp shown in FIG. 5.

As is more particularly visible in FIG. 7, the different surfaces 403, 407 and 413, which lead to the hollows 404, 408 and 414 and are inclined with respect to axis X–X', are respectively opposite the surfaces 405 and 412, which lead to the seats 406 and 411 and are inclined in the opposite direction with respect to this axis.

In this way, when axial movements are exerted on one of the parts constituting the connection, which is translated by displacements in the direction of the vertical arrows in FIG. 7, one of these surfaces is attained, either from a hollow or from a seat.

In other words, the surfaces for respectively guiding towards the hollows or towards the seats, are axially aligned with seats or hollows in which the catches may change direction or rest.

Figure 8:
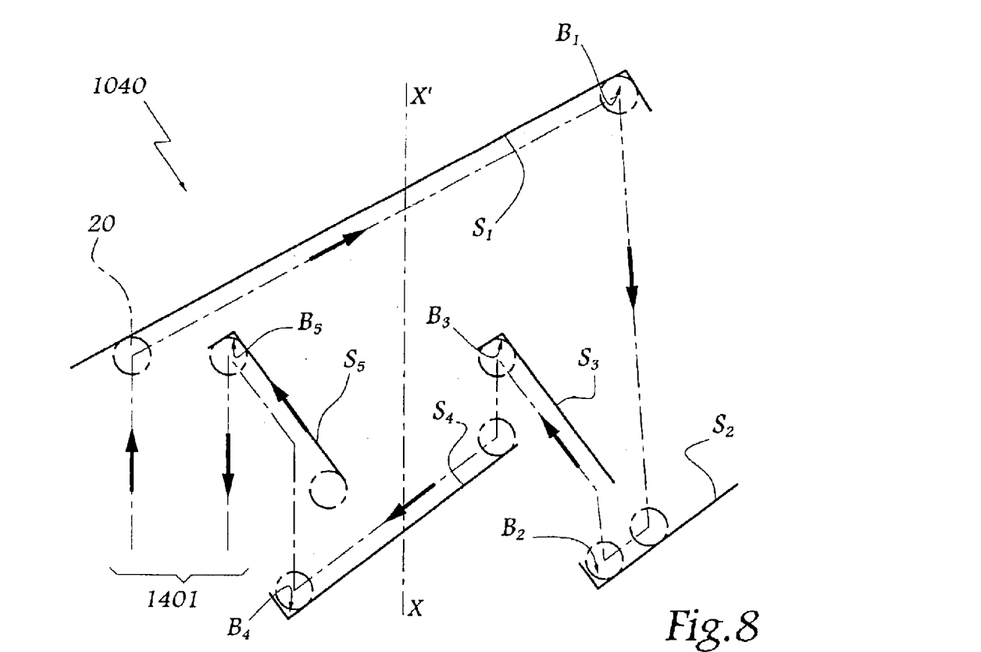
FIG. 8 is a view similar to FIG. 7, for a connection according to a second form of embodiment of the invention.

In the representation of FIG. 8, a ramp 1040 is formed and delimited by surfaces $S_1$ to $S_5$ of which each is terminated by a stop $B_1$ to $B_5$. In fact, the stops $B_2$ and $B_4$ are seats equivalent to seats 406 and 411 of the first embodiment, while the stops $B_1$, $B_3$ and $B_5$ correspond to hollows in which the projecting parts may be reoriented by sliding on a surface $S_1$, $S_3$ or $S_5$ to go in the direction of another surface $S_2$, $S_4$ or in the direction of the exit of the ramp 1040.

Another difference with respect to the first embodiment resides in the fact that the ramp 1040 has a common zone 1401 for entrance and exit of a projecting element, of the type such as stud 20.

Figure 9:
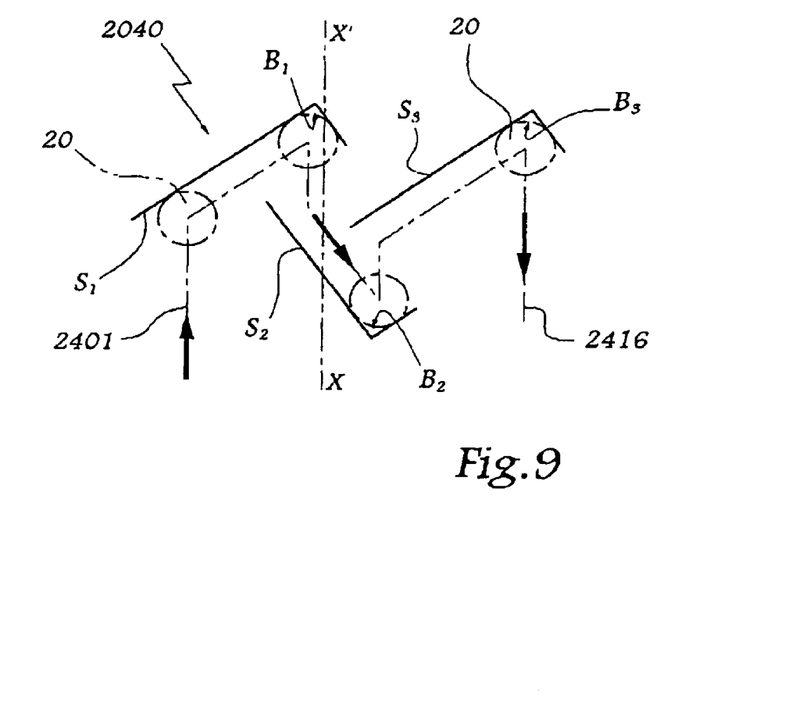
FIG. 9 is a view similar to FIG. 7, for a connection according to a third form of embodiment of the invention.

In the third form of embodiment shown in FIG. 9, the ramp 2040 is essentially delimited by three surfaces $S_1$, $S_2$ and $S_3$ which adjoin three stops $B_1$, $B_2$ and $B_3$ of which one, $B_2$, constitutes a seat similar to the seat 406 of the first embodiment, the stops $B_1$ and $B_3$ correspondent to hollows for change of direction during the advance of a projecting part in this ramp.

The ramp of this embodiment corresponds to a simplified version with respect to the first embodiment, in which a second seat for a decompression of the downstream pipe supplied by a connection is not provided.

The entrance 2401 of the ramp 2040 is separated from its outlet opening 2416.

Figure 10:
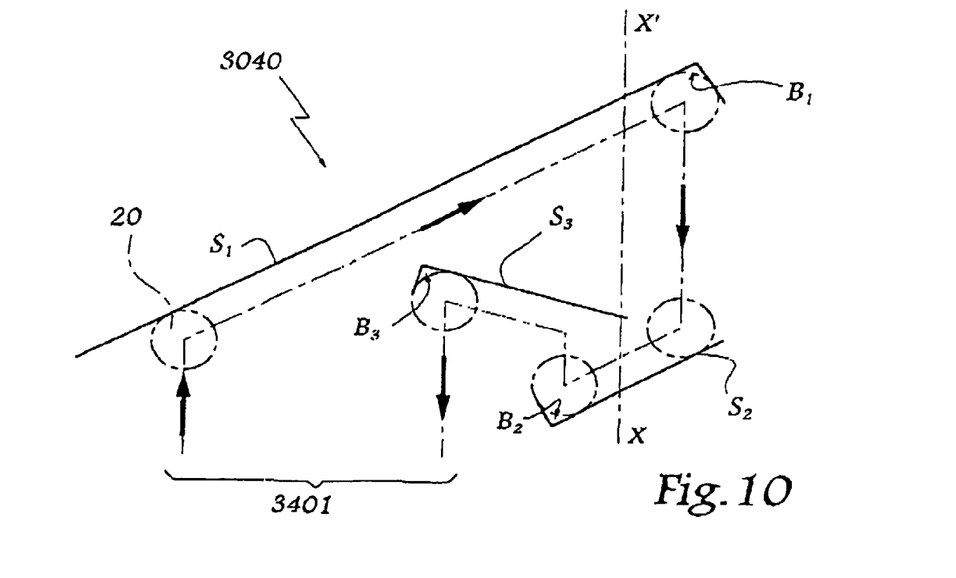
FIG. 10 is a view similar to FIG. 7, for a connection according to a fourth form of embodiment of the invention.

FIG. 10 shows a fourth form of embodiment which corresponds to the simplified embodiment of FIG. 8, like the embodiment of FIG. 9. The ramp 3040 of this embodiment is bordered by three surfaces $S_1$, $S_2$ and $S_3$ inclined with respect to the longitudinal axis of the connection, like the corresponding surfaces of the second and third embodiments, at whose ends are formed stops $B_1$, $B_2$, $B_3$. The stop $B_2$ constitutes a seat equivalent to seat 406 of the first embodiment, while stops $B_1$ and $B_3$ are zones of change of direction of a projecting part in displacement in the ramp 3040.

As in the third form of embodiment, only one seat is provided, while the entrance and the exit of the ramp 3040 are constituted by a single zone 3401.

Figure 11:
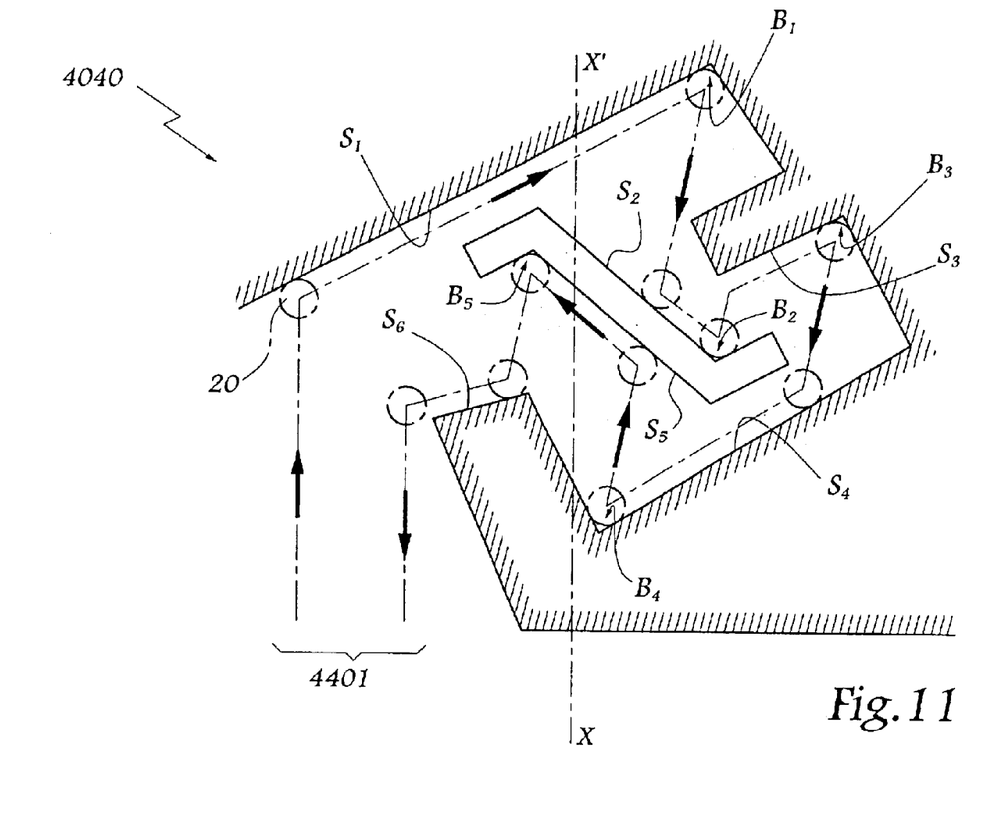
FIG. 11 is a view similar to FIG. 7, for a connection according to a fifth form of embodiment of the invention.

FIG. 11 shows a fifth form of embodiment in which six surfaces $S_1$ to $S_6$ inclined with respect to a longitudinal axis X–X' of the connection define five stops $B_1$ to $B_5$ of which two, stops $B_2$ and $B_4$ constitute seats for retaining a projecting part, three other stops $B_1$, $B_3$ and $B_5$ constituting zones of change of direction of the projecting part inside the ramp 4040 thus formed. As in the second and fourth embodiment, the entrance and exit of the ramp 4040 are constituted by a common zone 4401.

In the forms of embodiment of FIGS. 8 to 11, the surfaces $S_1$ to $S_6$ are located opposite the stops $B_1$ to $B_5$, being axially offset with respect thereto. The same observations are applicable for the surfaces and hollows identified in the first embodiment.

The invention is not limited to the examples described, and the technical characteristics of the different forms of embodiment may be combined together.

What is claimed is:

1. A quick connect coupling selectively connecting two pipes, said coupling comprising; a male element of a size to be received within a female element along a principal axis of the coupling, a first locking element including at least one ramp for receiving a second locking element in a form of a radial projection extending from said male element for locking said male and female elements when they are connected by application of an axial force being applied to said male and female elements relative to said principal axis, said ramp being in a ring mounted inside said female element and having an inlet opening for entrance of said radial projection, and with an exit opening for exit of said radial projection, said openings being oriented at an angle with respect to said principal axis in two distinct radial directions, said ring being free to rotate about and fixed in translation along said principal axis, said second locking element being fixed with respect to said male element, and said ramp forming at least one seat for locking said radial projection when said male element is connected within said female element to permit fluid flow therethrough and whereby no rotation of said female element relative to said male element is necessary to lock said female element to said male element.

2. The coupling of claim 1, wherein said ramp forms a second seat offset axially with respect to said first seat for locking said radial projection when said male element is connected to said female element to permit decompression of a downstream pipe of the two pipes.

3. The coupling of claim 2, wherein said ramp is delimited by surfaces inclined with respect to said principal axis and disposed axially opposite hollows forming stops for engaging and reorienting said radial projection.

4. The connection coupling of claim 1 including two ramps and two radial projections, said radial projections being substantially diametrically opposite, while said inlet opening of a first ramp is superposed with said outlet opening of a second ramp.

5. The coupling of claim 1, wherein said inlet opening and said exit opening of said ramp are constituted by a single zone for passage of said radial projection.

6. The coupling of claim 1, wherein said ramp is delimited, near said exit opening thereof, by a nose which directs said radial projection towards said inlet opening into said ramp.

7. A quick connect coupling selectively connecting two pipes, said coupling comprising; a male element of a sine to be received within a female element along a principal axis of the coupling, a first locking element including at least one ramp for receiving a second locking element in a form of a radial projection extending from said male element for locking said male and female elements when they are connected by application of an axial force being applied to said male and female elements relative to said principal axis, said ramp being in a ring mounted inside said female element, said ring being free to rotate about and fixed in translation along said principal axis, said second locking element being fixed with respect to said male element, said ramp forming at least one seat for locking said radial projection when said male element is connected within said female element to permit fluid flow therethrough and whereby no rotation of said female element relative to said male element is necessary to lock said female element to said male element, said ramp including an inlet zone extending from said inlet opening and converging in a direction of a first passage oriented in a direction of a first stop, and said first stop being disposed opposite a surface for guiding said radial projection in a direction of said at least one seat.

8. The coupling of claim 7, wherein said ramp forms a first and a second seat, said second seat being offset axially with respect to said first seat for locking said radial projection to permit decompression of a downstream pipe through the coupling and said ramp including a second stop disposed axially opposite a surface for guiding said radial projection in a direction of said second seat.

9. A quick connect coupling selectively connecting two pipes, said coupling comprising a male element of a size to be received within a female element along a principal axis of the coupling, a first locking element including at least one ramp for receiving a second locking element in a form of a radial projection extending from said male element for locking the male and female elements when they are connected by application of any axial force being applied to said male and female elements relative to said principal axis, said ramp being in a ring mounted inside said female element, said ring being free to rotate about and fixed in translation along said principal axis, said second locking element being fixed with respect to said male element, said ramp forming at least one seat for locking said radial projection when said male element is connected within said female element to permit fluid flow therethrough and whereby no rotation of said female element relative to said male element is necessary to lock said female element to said male element and a non-return device positioned between an inlet of said ramp and said at least one seat to thereby prevent said radial projection from moving relative to said ramp from said at least one seat to said inlet.

* * * * *